United States Patent
Lutz et al.

(10) Patent No.: US 12,256,025 B2
(45) Date of Patent: Mar. 18, 2025

(54) METHOD AND CONTROL SYSTEM FOR TECHNICAL INSTALLATIONS WITH CERTIFICATE MANAGEMENT

(71) Applicant: Siemens Aktiengesellschaft, Munich (DE)

(72) Inventors: Benjamin Lutz, Pfinztal (DE); Anna Palmin, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 364 days.

(21) Appl. No.: 17/146,738

(22) Filed: Jan. 12, 2021

(65) Prior Publication Data

US 2021/0218580 A1    Jul. 15, 2021

(30) Foreign Application Priority Data

Jan. 14, 2020    (EP) .................................... 20151787

(51) Int. Cl.
*H04L 9/32*    (2006.01)

(52) U.S. Cl.
CPC ................................. *H04L 9/3268* (2013.01)

(58) Field of Classification Search
CPC ............. G05B 19/042; G05B 19/4185; G05B 2219/24163; H04L 63/0823; H04L 9/3247; H04L 9/3268; Y02P 90/02
See application file for complete search history.

(56) References Cited

U.S. PATENT DOCUMENTS

| | | | | |
|---|---|---|---|---|
| 5,699,431 A | * | 12/1997 | Van Oorschot | H04L 9/3268 713/158 |
| 6,128,740 A | * | 10/2000 | Curry | H04L 63/0428 705/76 |

(Continued)

FOREIGN PATENT DOCUMENTS

| | | | |
|---|---|---|---|
| CA | 2492986 C | * | 3/2011 |
| CA | 2826126 A1 | * | 3/2014 |

(Continued)

OTHER PUBLICATIONS

EP Search Report dated Jun. 8, 2020 based on EP 20151787 filed Jan. 14, 2020.

(Continued)

*Primary Examiner* — Theodore C Parsons
(74) *Attorney, Agent, or Firm* — Cozen O'Connor

(57) ABSTRACT

A control system for a technical installation, in particular a manufacturing facility or process plant, includes at least one first operator station server and one second operator station server and is configured to initiate the issuance and revocation of certificates for components of the technical installation as part of certificate management, and is configured to publish revocation of a previously issued certificate within the control system as a certificate revocation list, where the control system is configured to store the certificate revocation list on the first operator station server and/or on the second operator station server, where the control system is configured to synchronize the first operator station server and the second operator station server with one another such that a certificate revocation list with identical content is stored on both operator station servers.

9 Claims, 2 Drawing Sheets

(56) References Cited

U.S. PATENT DOCUMENTS

| | | |
|---|---|---|
| 10,447,682 B1 * | 10/2019 | Du Lac ................. H04L 9/3247 |
| 2002/0004773 A1 | 1/2002 | Xu et al. |
| 2008/0052510 A1 | 2/2008 | Kim et al. |
| 2009/0019046 A1 * | 1/2009 | Coley ................. G06F 11/3466 |
| 2012/0266209 A1 * | 10/2012 | Gooding ................. H04L 63/20 |
| | | 726/1 |
| 2013/0031360 A1 * | 1/2013 | Dewitz ................... G06F 21/64 |
| | | 713/156 |
| 2013/0042117 A1 | 2/2013 | Birtwhistle et al. |
| 2013/0185551 A1 * | 7/2013 | Medvinsky ........... H04L 9/0891 |
| | | 713/155 |
| 2014/0068251 A1 * | 3/2014 | Ignaci ..................... H04L 9/006 |
| | | 713/158 |
| 2014/0373118 A1 * | 12/2014 | Doi ....................... H04L 9/3268 |
| | | 726/6 |
| 2016/0149890 A1 * | 5/2016 | Ujiie ....................... G06F 21/44 |
| | | 726/3 |
| 2016/0197891 A1 | 7/2016 | Kim et al. |
| 2016/0359635 A1 | 12/2016 | Kreft |
| 2018/0102904 A1 * | 4/2018 | Lin ..................... G06F 9/45558 |
| 2018/0159693 A1 * | 6/2018 | Condeixa ............ H04L 63/0823 |
| 2018/0323977 A1 * | 11/2018 | Hojsik .................. H04L 63/061 |
| 2019/0324419 A1 * | 10/2019 | Lutz ................... G05B 19/0425 |
| 2019/0363895 A1 * | 11/2019 | Barr, III ................ H04L 67/568 |
| 2020/0228351 A1 | 7/2020 | Kreft |
| 2020/0311028 A1 * | 10/2020 | Korepanov ........... G06F 16/178 |

FOREIGN PATENT DOCUMENTS

| | | | |
|---|---|---|---|
| CN | 1304109 | | 7/2001 |
| CN | 101443745 | | 5/2009 |
| CN | 104980438 | | 10/2015 |
| CN | 106899408 | | 6/2017 |
| CN | 104901931 B | * | 10/2018 |
| CN | 105556533 B | * | 10/2018 |
| DE | 102011108003 | | 1/2013 |
| EP | 1523126 A1 | * | 4/2005 |
| EP | 2706727 A1 | * | 3/2014 |
| JP | 2003-115840 | | 4/2003 |
| JP | 2004-056635 | | 2/2004 |
| WO | 2012123394 | | 9/2012 |
| WO | WO 2013/020705 A2 | | 2/2013 |

OTHER PUBLICATIONS

Office Action dated Jan. 14, 2022 issued in European Patent Application No. 20151787.7.

* cited by examiner

METHOD AND CONTROL SYSTEM FOR TECHNICAL INSTALLATIONS WITH CERTIFICATE MANAGEMENT

BACKGROUND OF THE INVENTION

1. Field of the Invention

The invention relates to a method and control system for a technical installation, in particular a manufacturing facility or process plant, which control system comprises at least one first operator station server and one second operator station server, and which, in the context of certificate management, is configured to initiate issuance and revocation of certificates for components of the technical installation, and to publish any revocation of a previously issued certificate within the control system as a certificate revocation list.

2. Description of the Related Art

As part of certificate management of an industrial plant, it must not only be possible to issue certificates, but also to revoke them. Revocation of certificates used by a plant component particularly occurs when the plant component is taken out of service and when it is substituted (i.e., replaced by another component) and can occur while the plant is operating. The certificates used are invalidated by the revocation. Otherwise, they could possibly be misused, e.g., by a written-off and dismantled device being used (possibly in another part of the plant) for communication using these certificates.

Also in the context of modular automation, the ability to trigger the revocation of particular certificates if necessary is indispensable. This is due to the fact that a module combines or can combine with various other modules in different projects and is generally assigned project-specific certificates that it requires to communicate with other modules in the respective project context. As soon as the use of a module in a particular project context is no longer required (and therefore must be prevented), all project-specific certificates assigned to the module in that project context should be revoked to prevent misuse of the certificates.

In the context of automated certificate management of a technical installation, it is essential all plant components that use certificates for communication with other components can check the revocation status of the certificate of the respective communication partner at any time. Checking the revocation status is a mandatory step as part of certificate validation in accordance with Internet Engineering Task Force (IETF) standard "RFC 5280" and International Electrotechnical Commission (IEC) standard 62443-4-2. If a plant component is unable to check the revocation status of the certificate of its respective communication partner, then the certificate is rejected as invalid by default and the communication process is aborted. This severely impairs the normal operation and availability of a technical installation.

In the context of a technical installation, it is therefore essential to allow all legitimate planned communication partners mutual access to the certificate revocation lists for their certificates. Each plant component should be able to access the current certificate revocation list for the certificate of the respective legitimate communication partner as well as the certificate revocation list for its own certificate.

If only one certification authority (CA) is operated in a plant and all the plant components obtain certificates from this certification authority, there is only one (single) certificate revocation list. However, if (as is often the case) several (possibly project-specific or plant-section-specific) certification authorities are used, then there is usually a certificate revocation list for each of these certification authorities. For security reasons, however, the plant components must not be allowed to access certificate revocation lists that they do not need, in the context of the plant or respective project, for communication with their planned communication partners.

Certificate revocation which, depending on the scenario, can be triggered by a plant component itself or by an authorized (administrative) instance, involves submitting a revocation request to a certification authority (CA) that issued the certificate in question. Such revocation requests are an integral part of known certificate management protocols, such as CMP as defined in RFC 4210, and are supported by the certification authorities, e.g., by the EJBCA/PrimeKey CA. For other certification authorities that support protocols which do not have revocation requests as a message type within their scope, revocation can be implemented either manually, directly at the certification authority (e.g. via its web front-end), or by application (e.g., initiated by a registration authority (RA)).

The certificate revoked by a registration authority is then placed by the registration authority on a certificate revocation list (CRL) that already contains other certificates (originally issued by it and revoked at a later date). This certificate revocation list is specific to the certification authority and is usually stored locally in the certification authority or rather on the server on which it runs. In order to prevent tampering with the certificate revocation lists, after they have been issued/updated, the certificate revocation lists (similarly to certificates) are signed by the issuing certification authorities (issuing CAs) using their private keys. The signature and thus the integrity and authenticity of a certificate revocation list can be verified using the certificate of the CA that issued and signed the certificate revocation list. More precisely, the CA's public key, which is included in its certificate, is used for signature validation.

The certificate revocation lists stored in the respective certification authority are usually updated cyclically (at fixed intervals configured in the respective certification authority). They can then be distributed manually or by application (e.g., via http/HTTPS or using an appropriate application/script) to specific other instances in different network segments of the technical installation. Such certificate revocation list distribution points (the certificate distribution points (CDPs) must be set up and the corresponding network settings (including the firewall rule) must be configured such that each plant component that requires the certificates for secure communication and acts as a communication participant in a specific network segment can successfully access a CDP in that network segment. To ensure that the plant components "know" where to find the necessary certificate revocation lists for the certificates of their communication partners, the addresses (e.g., URLs) of the CDPs are included in the certificates by the certification authority or made known to the plant components in another way (e.g., by including them in their configuration files).

Access of the certificate revocation lists stored on various distribution points (CDPs) in specific network segments by the terminal devices that need to check the revocation status of their partners' certificates is often inoperative or "suddenly" stops working, e.g., due to changes made to the network settings. This results in timeouts and communication interruptions, thereby severely jeopardizing the availability of the plant. Here, troubleshooting is usually very time-consuming, which means that the problems are often long-lasting.

SUMMARY OF THE INVENTION

It is an object of the invention to provide a technical installation control system that allows certificate management with reliable interrogation of a certificate's revocation status.

This and other objects and advantages are achieved in accordance with the invention by a method and a control system for a technical installation, where the control system includes at least one first operator station server and a second operator station server, where the control system is configured to initiate issuance and revocation of certificates for components of the technical installation as part of certificate management and configured to publish any revocation of a previously issued certificate within the control system as a certificate revocation list, where the control system is configured to store the certificate revocation list on the first operator station server and/or on a second operator station server, and where the control system is further configured to synchronize the first operator station server and the second operator station server with one other such that a certificate revocation list with identical content is stored on both operator station servers.

In this context, a control system is understood as being a computer-supported technical system that includes functionalities for displaying, operating and controlling a technical system such as a manufacturing or production plant. Here, the control system comprises sensors for determining measured values, and various actuators. The control system also comprises process- or production-related components that are used to control the actuators or sensors. In addition, the control system has, among other things, means for visualizing the technical installation and for engineering purposes. The term control system also includes additional computing units, such as processors and/or microprocessor for more complex controls and systems for data storage and processing.

The technical installation can be a plant in the process industry such as a chemical, pharmaceutical or petrochemical plant, or a plant from the food and beverage industry. This also includes any industrial production facilities or factories in which, for example, cars or goods of all kinds are produced. Technical installations that are suitable for implementing the method in accordance with the invention can also come from the field of power generation. Wind turbines, solar parks or power plants for generating electricity are also subsumed under the term technical installation.

An "operator station server" in this case means a server that centrally collects data from an operator communication and monitoring system as well as generally alarm and measured-value archives of a control system of a technical installation and makes them available to users. The operator station server usually establishes a communication link to automation systems of the technical installation and forwards data of the technical installation to "clients" that are used for operator control and observation of the operation of the individual functional elements of the technical installation. The operator station server can have client functions for accessing the data (archives, messages, tags, variables) of other operator station servers. This enables images of operation of the technical installation on the operator station server to be combined with variables of other operator station servers (server-server communication). The operator station server can be, but is not limited to, a Siemens SIMATIC PCS 7 industrial workstation server.

A component can be individual sensors or actuators of the technical system. However, a component can also be a combination of a plurality of sensors and/or actuators, e.g., a motor, a reactor, a pump or a valve system.

A certificate is understood to mean a digital data record that confirms particular characteristics (in this case of machines, devices, or applications). The authenticity and integrity of the certificate can generally be verified via cryptographic methods.

The certificate revocation list (CRL) contains information about certificates revoked in the control system. The certificate revocation list is usually issued or reissued by a certification authority of the control system or technical installation on a regular or event-driven basis, e.g., triggered by the revocation of a certificate.

The certificate revocation list, i.e., the information regarding already revoked certificates, is stored in accordance with the invention on one or both operator station servers. The operator station servers have high availability and are suitable as central points of contact for components of the technical installation that require a certificate for communication. Particularly advantageously, when requesting a revocation status of a certificate of a (potential) communication partner, a component can contact one or both operator station servers to request a current status with regard to the revocations by means of the certificate revocation list. The automatic synchronization of the certificate revocation list between the individual operator station servers guarantees that the certificate revocation list used for the query is also up-to-date.

The abovementioned dissemination of information relating to revocation within the control system means that all the components of the technical installation are always up to date with respect to the issued certificates, which significantly reduces the risk of certificate misuse. Its publication ensures that information regarding all revoked certificates in the context of the installation is always available.

Revocation is preferably initiated in an event-controlled and fully automated manner from the process control system, thereby ensuring that the certificates to be revoked are revoked with utmost immediate effect and their revocation is also published without significant delay. This allows delays in the revocation process to be efficiently minimized, which improves certificate management of the technical installation's control system overall.

Any status changes within the technical installation can be considered as events. As part of an advantageous embodiment of the invention, a change in communication relationships between individual components of the technical installation constitutes such an event.

The revocation service of the control system is advantageously configured to initiate the revocation of certificates by submitting a revocation request to a certification authority. The revocation service is configured to monitor the processing of the revocation request or cause it to be monitored. This means that the revocation service either monitors the processing of the revocation request itself, i.e., directly, or causes it to be monitored by a separate service, i.e., indirectly, in particular via a registration service.

The certification authority is also referred to as an "issuing CA". Such an issuing CA is usually always online and, on the basis of incoming certificate requests, issues certificates to various requesters who sign them with their own issuing CA certificate. The trustworthiness of the issuing CA is ensured by the fact that its own issuing CA certificate is signed by the certificate of a trusted root certification authority (also referred to as a "root CA") located in a secure environment. It should be noted that the root CA is offline most of the time and is only activated or switched on (subject to the strictest security precautions) when it is to issue a certificate for an associated issuing CA. The root CA can be located outside the technical installation.

As part of monitoring the revocation request by the revocation service, the revocation service can send a new request to the certification authority in the event of a delay in processing the revocation request (this is referred to as "polling" in this context). This process is described, for example, in the Request for Comments (RFC) 4210 standard in which the Certificate Management Protocol (CMP) is specified.

In the case of a particularly preferred embodiment of the invention, following certificate revocation the control system is configured to publish the revocation within the control system, where publication particularly takes the form of a certificate revocation list.

If certificate revocation lists are used, then the revoked certificates can be published by the certification authority. Such an entry in the certificate revocation list is digitally signed by the certification authority to guarantee the authenticity of the entry. Among other things, this prevents the certificate revocation list itself from being updated by a user (e.g., a project engineer) or an intelligent service, which reduces the risk of misuse.

As part of an advantageous embodiment of the invention, the control system has at least one first component connected to the first operator station server and/or the second operator station server and at least one second component connected to the first operator station server and/or the second operator station server. The first component forms part of a first engineering project and the second component forms part of a second engineering project. The control system is configured to store a first certificate revocation list specific to the first engineering project on the first operator station server and/or the second operator station server and is configured to store a second certificate revocation list specific to the second engineering project on the first operator station server and/or the second operator station server. The first component has access solely to the first certificate revocation list and the second component has access solely to the second certificate revocation list.

Having project-specific certificate revocation lists available throughout the installation provides an ad-hoc way of discriminating between certificates that are permitted for a specific project and those which are not. In accordance with the minimality principle (which has a very high priority in the context of industrial security), each plant component is only granted access to the certificate revocation lists that it really needs and as immediately as possible after they have been updated.

It is also an object of the invention to provide a method in accordance with the invention, where the method comprises a) initiating issuance of a certificate to a component of a technical installation by a control system of the technical installation, b) initiating revocation of the certificate by a computer-implemented revocation service of the control system of the technical installation, c) publishing revocation of the previously issued certificate within the control system as a certificate revocation list that is stored on the first operator station server and/or on the second operator station server, and d) synchronizing the first operator station server with the second operator station server such that a certificate revocation list with identical content is stored on both operator station servers.

With regard to the explanations relating to the method claim and the associated advantages, the foregoing statements relating to the control system according to the invention are herewith incorporated by reference.

Certificate revocation is preferably initiated in an automated manner in response to a specific event.

In an advantageous embodiment of the method in accordance with the invention, a change in communication relationships between components of the technical installation constitutes an event that triggers automated initiation of certificate revocation.

The revocation service for initiating the revocation of certificates preferably submits a revocation request to a certification authority, where the revocation service monitors the processing of the revocation request.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The above described characteristics, features and advantages of this invention and the manner in which they are achieved will become clearer and more readily comprehensible in conjunction with the following description of the exemplary embodiment which will be explained in more detail with reference to the accompanying drawings, in which.

DETAILED DESCRIPTION OF THE EXEMPLARY EMBODIMENTS

Figure 1:
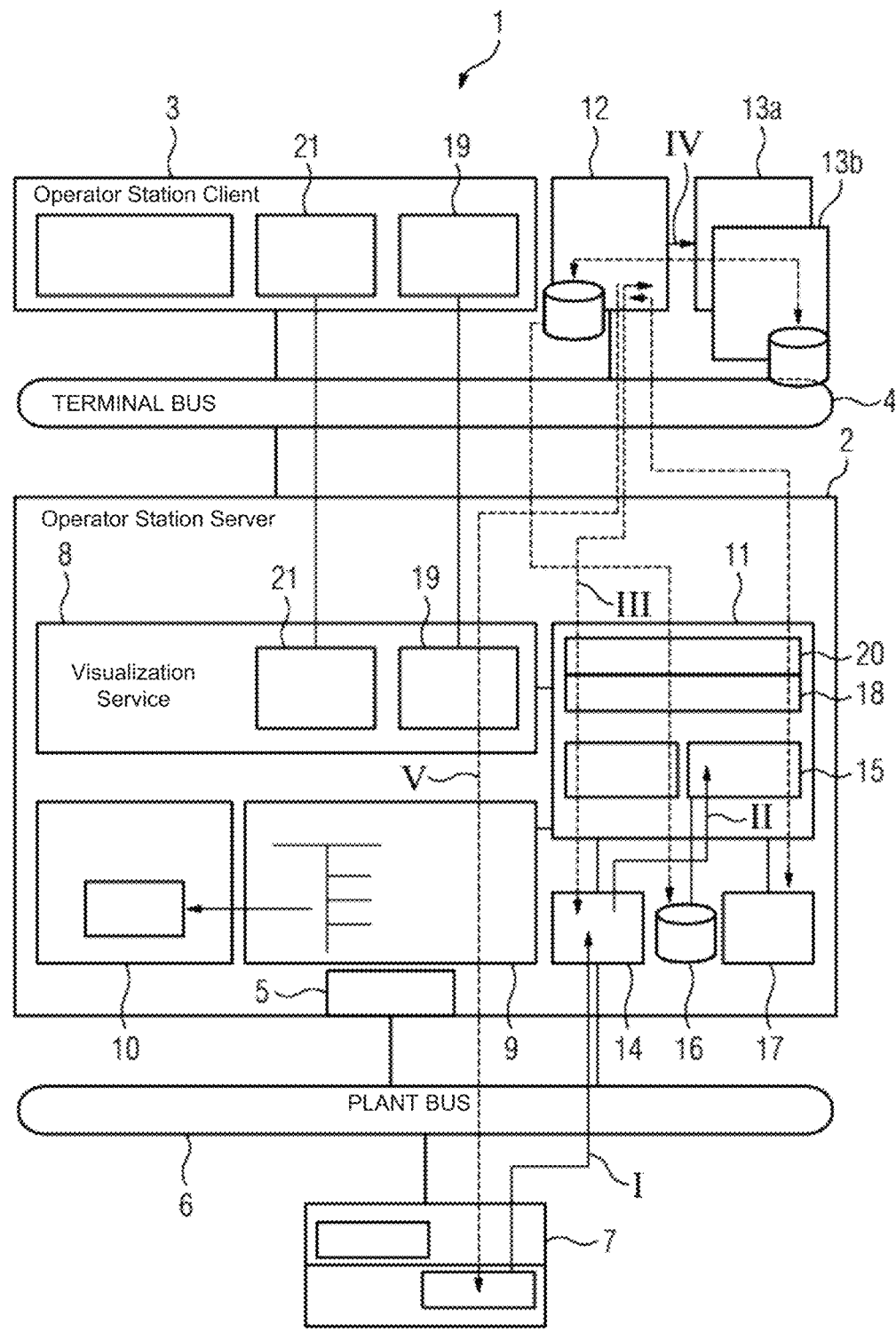
FIG. 1 is a schematic block diagram of a control system of a technical installation formed as a process plant, in accordance with the invention.

FIG. 1 shows part of an inventive control system 1 of a technical installation formed as a process plant. The control system 1 comprises a first server of an operator communication system or more specifically a first operator station server 2, a second operator station server (not shown in the drawing) and an associated operator station client 3. The operator station server 2 and the operator station client 3 are connected via a terminal bus 4 to each other and to other components of the control system 1 (not shown) such as an engineering station server or a process data archive.

A user or operator has access to the operator station server 2 via the operator station server 3 over the terminal bus 4 in the context of operating and monitoring. The terminal bus 4 can be implemented as industrial Ethernet, for example, but is not limited thereto. The structural configuration of the first operator station server 2 will be explained below. The second (and any other) operator station server has an essentially comparable structure and comparable functionalities.

The operator station server 2 has a device interface 5 that is connected to a plant bus 6. This allows the operator station server 2 to communicate with an (external) device 7. The connected device 7 can alternatively be an application, in particular a web application. Within the scope of the invention, any number of devices and/or applications 7 can be connected to the operator station server(s) 2. The plant bus 6 can be implemented as an industrial Ethernet, for example, but is not limited thereto. The device 7 can in turn be connected to any number of subsystems (not shown).

Incorporated into the operator station server 2 is a visualization service 8 via which (visualization) data can be transmitted to the operator station client 3. The operator station server 2 also has a process image 9, a process data archive 10 and a "User Profile and Selection Service (UPSS)" 11. Stored in the process image 9 of the operator station server 2 is a snapshot of the (signal) states of the devices and/or applications 7 connected to the operator station server 2 via the device interface 5. Past (signal) states are stored in the process data archive 10 for archiving purposes.

The "User Profile and Selection Service" 11 constitutes a database in which user profiles and personal settings of an operator/user of the process plant are stored. These can also be made available to other operators/users.

The control system 1 also comprises a registration authority 12, a first certification authority 13a and a second certification authority 13b. These are connected to the operator station server 2 and the operator station client 3 via the terminal bus 4. The registration authority 12 is configured to receive and forward certification applications to the first certification authority 13a and the second certification authority 13b. The certification authorities 13a, 13b are used to issue certificates, where each certification authority 13a, 13b is responsible for a specific engineering project in the context of which devices and/or applications 7 communicate with each other within the process plant.

If, in the context of a specific engineering project, a device 7 wants to log on to the control system 1 and use its functionalities, then the device 7 requires a valid certificate. In a first step I, the device 7 applies to a certification service 14 of the operator station server 2. In a second step II, the certification service 14 accesses a certificate revocation list 15 stored in the User Profile and Selection Service 11 and specific to the engineering project within which the device 7 wishes to communicate. Stored in this project-specific certificate revocation list (CRL) 15, i.e., in a database 16 of the User Profile and Selection Service 11, are certificates revoked in the context of the process plant at the time the certificate revocation list 15 is accessed.

If the device 7 is entitled to the certificate being applied for in the context of the engineering project, i.e., in particular if the certificate is not listed as a revoked certificate in the certificate revocation list 15, then the corresponding certificate request is forwarded, in a third step III, to the registration authority 12 which in turn, in a fourth step IV, forwards the certificate request to the appropriate certification authority 13a, 13b. The certificate issued by the appropriate certification authority 13a, 13b is then transmitted to the requesting device 7 by the registration authority 12 (step V).

If a particular event now occurs, e.g., a change in communication relationships within the process plant, a particular certificate can become invalid and must therefore be revoked. Proceeding from a revocation service 17 of the operator station server 2, a revocation request is transmitted to the registration authority 12. The revocation request is initiated in a fully automated manner without any direct action on the part of a project engineer or operator of the process plant. The appropriate certification authority 13a, 13b then declares the respective certificate invalid and stores this information on a project-specific certificate revocation list 15 stored in the certification authority 13a, 13b. The updated certificate revocation list 15 is then transmitted to the database 16 of the User Profile and Selection Service 11 by the registration authority 12.

The event-controlled collection of the certificate revocation list 15 from the certification authority 13a, 13b by the registration authority 12 can be implemented in different ways. In the simplest case, a trigger can be configured in the certification authority 13a, 13b that causes the certificate revocation list 15 stored locally in the certification authority 13a, 13b to be replaced immediately by an updated certificate revocation list 15 after revocation of a certificate. The storage location of the certificate revocation list 15 in the certification authority 13a, 13b can be monitored from the registration authority 12 (e.g., by an appropriate intelligent service) so that any update can be recognized immediately and the updated certificate revocation list 15 sent immediately to the User Profile and Selection Service 11 of the operator station server 2. As an alternative to monitoring the storage location, the certificate revocation list 15 stored locally in the certification authority 13a, 13b and which is immediately replaced by an updated certificate revocation list 15 after revocation of a certificate can be forwarded simultaneously (in an event-controlled manner, e.g., by an appropriate intelligent service) to the registration authority 12.

To increase the availability of the certificate revocation list 15, or more precisely of the project-specific certificate revocation lists 15 when a plurality of operator station servers 2 are used, the database 16 is synchronized between the individual operator station servers 2 via a "mirroring" service 18.

With an interface 19 graphically displayed by the visualization service 8 on the operator station client 3, an operator/project engineer can specify new/revised events that are made available to the revocation service 17 via a manage service 20 of the User Profile and Selection Service 11 for future automated certificate revocations. With another interface 21, the operator/project engineer can determine which certificate revocation list 15 can be used in the context of which engineering project. This information is stored in a "white list" 22 on the operator station server 2 by means of the manage service 20.

Figure 2:
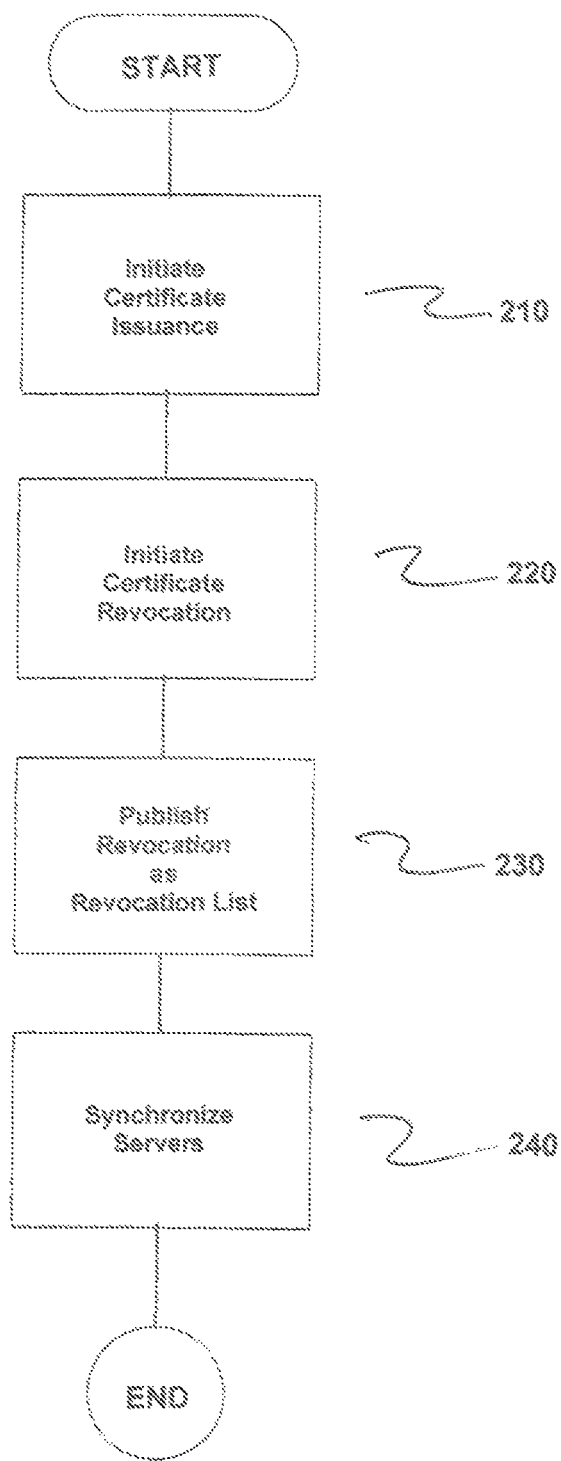
FIG. 2 is a flowchart of the method in accordance with the invention.

FIG. 2 is a flowchart of the method in accordance with the invention. The method comprises initiating, by a control system 1 of a technical installation, issuance of a certificate to a component 7 of the technical installation, as indicated in step 210. In accordance with the invention, the control system 1 includes at least one first operator station server 2 and a second operator station server.

Next, a computer-implemented revocation service 17 of the control system 1 of the technical installation initiates revocation of the certificate, as indicated in step 220.

Next, the revocation of a previously issued certificate within the control system 1 is published as a certificate revocation list 15 that is stored on at least one of (i) the first operator station server 2 and (ii) the second operator station server, as indicated in step 230.

Next, the at least one first operator station server 2 and the second operator station server are synchronized such that a certificate revocation list 15 with identical content is stored on the first and second operator station servers 2, as indicated in step 240.

The technical features described above make it possible to achieve high availability of knowledge concerning revoked certificates, which is indispensable for efficient certificate management. In addition, each device 7 (in accordance with the minimality principle which has a very high priority in the context of industrial security) is only granted access to the current project-specific certificate revocation lists 15 that it really needs. The technical functions required for this purpose are "procedurally" integrated in the control system 1 so that no other communication paths "outside the control system 1" are required for revocation management in addition to the communication paths already existing within the scope of the control system 1.

Another advantage with respect to security is that no special settings have to be made in the network because of the required access to the certificate revocation lists 15 (e.g., no ports have to be opened, which entails a high security risk). The described control system 1 is highly suitable for modularized plants where process plant sections are added or removed dynamically.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A control system of a manufacturing facility, the control system comprising:
   at least one first operator station server including a processor, a certificate revocation list and a revocation service;
   a second operator station server including a microprocessor and memory;
   at least one first component connected to the at least one first operator station server; and
   at least one second component connected to the second operator station server, the least one first and second components comprising at least one of sensors and actuators or a combination of sensors and actuators of the manufacturing facility;
   wherein the control system of the manufacturing facility initiates issuance and revocation of certificates for access to components of the manufacturing facility as part of certificate management and publishes any revocation of a previously issued certificate within the control system as the certificate revocation list within the at least one first operator station server;
   wherein the control system stores the certificate revocation list on at least one of (i) a user profile and selection service of the at least one first operator station server and (ii) a second user profile and selection service of the second operator station server;
   wherein the control system synchronizes the at least one first operator station server and second operator station server with one another via a mirroring service of the user profile and selection service such that a certificate revocation list with identical content is stored on the first and second operator station servers;
   wherein new/revised events are provided to the revocation service via a manage service of the user profile and selection service for future automated certificate revocations;
   wherein the at least one first component forms part of a first engineering project and the at least one second component forms part of a second engineering project;
   wherein the control system stores a first certificate revocation list specific to the first engineering project on at least one of (i) the user profile and selection service of the at least one first operator station server and (ii) the second user profile and selection service of the second operator station server, and stores a second certificate revocation list specific to the second engineering project on at least one of (i) the user profile and selection service of the at least one first operator station server and (ii) the second user profile and selection service of the of the second operator station server; and
   wherein the at least one first component has access solely to the first certificate revocation list and the at least one second component has access solely to the second certificate revocation list.

2. The control system as claimed in claim 1, wherein the revocation service comprises a computer-implemented revocation service which initiates the revocation of certificates in an event-controlled and automated manner.

3. The control system as claimed in claim 2, wherein a change in communication relationships between components of the manufacturing facility constitutes an event taken into account for initiating the revocation of certificates.

4. The control system as claimed in claim 2, wherein the revocation service initiates revocation of certificates by said revocation service submitting a revocation request to a certification authority; and
   wherein the revocation service one of (i) monitors processing of the revocation request and (ii) causes processing of the revocation request to be monitored.

5. The control system as claimed in claim 1, wherein a change in communication relationships between components of the manufacturing facility constitutes an event taken into account for initiating the revocation of certificates.

6. A method comprising:
   a) initiating, by a control system of a manufacturing facility, issuance of a certificate for access to a component of the manufacturing facility, the control system including at least one first operator station server including a processor, a certificate revocation list and a computer-implemented revocation service, including a second operator station server having a microprocessor and memory, including at least one first component connected to the at least one first operator station server and including at least one second component connected to the second operator station server;
   b) initiating, by the computer-implemented revocation service of the control system of the manufacturing facility, revocation of the certificate for access to the component of the manufacturing facility;
   c) publishing the revocation of a previously issued certificate within the control system as a certificate revocation list which is stored on at least one of (i) a user profile and selection service of the first operator station server and (ii) a second user profile and selection service of the second operator station server; and
   d) synchronizing the at least one first operator station server and the second operator station server via a mirroring service of the user profile and selection service such that a certificate revocation list with identical content is stored on the first and second operator station servers;

wherein new/revised events are provided to the revocation service via a manage service of the user profile and selection service for future automated certificate revocations;

wherein the at least one first component forms part of a first engineering project and the at least one second component forms part of a second engineering project, the least one first and second components comprising at least one of sensor and actuators or a combination of sensors and actuators of the manufacturing facility;

wherein the control system stores a first certificate revocation list specific to the first engineering project on at least one of (i) the user profile and selection service of the at least one first operator station server and (ii) the second user profile and selection service of the second operator station server, and stores a second certificate revocation list specific to the second engineering project on at least one of (i) the user profile and selection service of the at least one first operator station server and (ii) the second user profile and selection service of the of the second operator station server; and wherein the at least one first component has access solely to the first certificate revocation list and the at least one second component has access solely to the second certificate revocation list.

7. The method as claimed in claim 6, wherein a change in communication relationships between components of the manufacturing facility constitutes an event which triggers automated initiation of revocation of the certificate.

8. The method as claimed in claim 7, wherein the revocation service submits a revocation request to a certification authority to initiate the revocation of certificates; and wherein the revocation service one of (i) monitors the processing of the revocation request and (ii) instigates the monitoring of the revocation request.

9. The method as claimed in claim 6, wherein the revocation service submits a revocation request to a certification authority to initiate the revocation of certificates; and wherein the revocation service one of (i) monitors the processing of the revocation request and (ii) instigates the monitoring of the revocation request.

* * * * *